(12) United States Patent
Xu et al.

(10) Patent No.: US 10,959,254 B2
(45) Date of Patent: Mar. 23, 2021

(54) RADIO COMMUNICATIONS METHOD, BASE STATION, AND TERMINAL

(71) Applicant: Huawei Technologies Co., Ltd., Shenzhen (CN)

(72) Inventors: Kai Xu, Shenzhen (CN); Xiaocui Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/077,707

(22) PCT Filed: Mar. 31, 2016

(86) PCT No.: PCT/CN2016/078188
§ 371 (c)(1),
(2) Date: Aug. 13, 2018

(87) PCT Pub. No.: WO2017/166228
PCT Pub. Date: Oct. 5, 2017

(65) Prior Publication Data
US 2019/0045528 A1 Feb. 7, 2019

(51) Int. Cl.
*H04W 72/12* (2009.01)
*H04L 5/00* (2006.01)
(Continued)

(52) U.S. Cl.
CPC ........... *H04W 72/1268* (2013.01); *H04L 1/18* (2013.01); *H04L 5/001* (2013.01); *H04L 5/0044* (2013.01);
(Continued)

(58) Field of Classification Search
CPC ................................................. H04W 72/1268
(Continued)

(56) References Cited

U.S. PATENT DOCUMENTS

2011/0086659 A1 4/2011 Yoon et al.
2013/0194931 A1 8/2013 Lee et al.
(Continued)

FOREIGN PATENT DOCUMENTS

CN 102137504 A 7/2011
CN 103929816 A 7/2014
(Continued)

OTHER PUBLICATIONS

Machine Translation and Abstract of Chinese Publication No. CN102137504, Jul. 27, 2011, 19 pages.
(Continued)

*Primary Examiner* — Peter G Solinsky
(74) *Attorney, Agent, or Firm* — Conley Rose, P.C.

(57) ABSTRACT

A radio communications method, a base station, and a terminal, where the base station sends downlink control information to the terminal, where the downlink control information includes uplink scheduling indication information, and the uplink scheduling indication information instructing the terminal to send uplink data in a plurality of uplink subframes on at least one unlicensed carrier such that the terminal sends uplink data in a plurality of uplink subframes on one or more corresponding unlicensed carriers based on the uplink scheduling indication information, thereby implementing scheduling, using uplink scheduling indication information in one piece of downlink control information, of a plurality of uplink subframes to perform uplink transmission. This increases a data volume in data transmission while effectively reducing scheduling signaling overheads.

20 Claims, 8 Drawing Sheets

(51) Int. Cl.
*H04L 1/18* (2006.01)
*H04L 27/00* (2006.01)
*H04W 72/04* (2009.01)

(52) U.S. Cl.
CPC ........ *H04L 5/0053* (2013.01); *H04L 27/0006* (2013.01); *H04W 72/0446* (2013.01); *H04W 72/12* (2013.01); *H04W 72/1284* (2013.01); *H04W 72/1289* (2013.01); *H04L 5/0082* (2013.01); *H04W 72/0486* (2013.01)

(58) Field of Classification Search
USPC ........................................................ 370/329
See application file for complete search history.

(56) References Cited

U.S. PATENT DOCUMENTS

| | | | |
|---|---|---|---|
| 2015/0043501 | A1 | 2/2015 | Aiba et al. |
| 2015/0341921 | A1* | 11/2015 | Chen ................ H04W 72/0413 370/330 |
| 2016/0057737 | A1 | 2/2016 | Kim |
| 2016/0066343 | A1 | 3/2016 | Lin et al. |
| 2016/0095048 | A1* | 3/2016 | Nory ..................... H04W 24/08 370/252 |
| 2016/0095101 | A1* | 3/2016 | Ye ......................... H04L 1/1812 |
| 2016/0233989 | A1* | 8/2016 | Belghoul ................. H04L 5/14 |
| 2016/0249337 | A1 | 8/2016 | Liang et al. |
| 2017/0150367 | A1* | 5/2017 | Han ........................ H04L 5/001 |
| 2017/0164384 | A1* | 6/2017 | Wang .................... H04L 5/0053 |
| 2017/0223550 | A1* | 8/2017 | Takeda .................. H04W 16/14 |
| 2017/0273108 | A1* | 9/2017 | Damnjanovic ..... H04L 27/2602 |
| 2017/0273109 | A1* | 9/2017 | Babaei .............. H04W 72/1268 |
| 2018/0324619 | A1* | 11/2018 | Harada ................. H04W 24/10 |
| 2018/0352564 | A1* | 12/2018 | Ye ......................... H04L 5/0053 |
| 2018/0359772 | A1* | 12/2018 | Park ...................... H04W 16/14 |
| 2018/0376339 | A1* | 12/2018 | Hu ........................ H04W 16/14 |
| 2019/0021105 | A1* | 1/2019 | Hamidi-Sepehr ..... H04W 72/14 |
| 2019/0045544 | A1* | 2/2019 | Wang ................ H04W 74/0808 |
| 2019/0069312 | A1* | 2/2019 | Oh ........................ H04W 72/04 |
| 2019/0110307 | A1* | 4/2019 | Kim .................. H04W 74/0808 |

FOREIGN PATENT DOCUMENTS

| | | |
|---|---|---|
| CN | 104519515 A | 4/2015 |
| CN | 105323049 A | 2/2016 |
| CN | 105323854 A | 2/2016 |
| JP | 2015122792 A | 7/2015 |
| RU | 2628011 C2 | 8/2017 |
| WO | 2014110467 A1 | 7/2014 |
| WO | 2015023659 A1 | 2/2015 |
| WO | 2015057368 A1 | 4/2015 |
| WO | 2015116866 A1 | 8/2015 |
| WO | 2015126563 A1 | 8/2015 |

OTHER PUBLICATIONS

Machine Translation and Abstract of Chinese Publication No. CN103929816, Jul. 16, 2014, 18 pages.
Machine Translation and Abstract of Chinese Publication No. CN105323854, Feb. 10, 2016, 17 pages.
Huawei, et al., "Scheduling design for eLAA" R1-160299, 3GPP TSG RAN WG1 Meeting #84, Feb. 15-19, 2016, 4 pages.
"3rd Generation Partnership Project; Technical Specification Group Radio Access Network; Evolved Universal Terrestrial Radio Access (E-UTRA); Multiplexing and channel coding (Release 13)," 3GPP TS 36.212, V13.1.0, Mar. 2016, 129 pages.
"3rd Generation Partnership Project; Technical Specification Group Radio Access Network; Evolved Universal Terrestrial Radio Access (E-UTRA); Radio Resource Control (RRC); Protocol specification (Release 13)," 3GPP TS 36.331, V13.0.0, Dec. 2015, 507 pages.
"3rd Generation Partnership Project; Technical Specification Group Radio Access Network; Evolved Universal Terrestrial Radio Access (E-UTRA); Physical layer procedures (Release 13)," 3GPP TS 36.213, V13.1.0, Part 1, Mar. 2016, 6 pages.
"3rd Generation Partnership Project; Technical Specification Group Radio Access Network; Evolved Universal Terrestrial Radio Access (E-UTRA); Physical layer procedures (Release 13)," 3GPP TS 36.213, V13.1.0, Part 2, Mar. 2016, 38 pages.
"3rd Generation Partnership Project; Technical Specification Group Radio Access Network; Evolved Universal Terrestrial Radio Access (E-UTRA); Physical layer procedures (Release 13)," 3GPP TS 36.213, V13.1.0, Part 3, Mar. 2016, 210 pages.
"3rd Generation Partnership Project; Technical Specification Group Radio Access Network; Evolved Universal Terrestrial Radio Access (E-UTRA); Physical layer procedures (Release 13)," 3GPP TS 36.213, V13.1.0, Part 4, Mar. 2016, 79 pages.
"3rd Generation Partnership Project; Technical Specification Group Radio Access Network; Evolved Universal Terrestrial Radio Access (E-UTRA); Physical layer procedures (Release 13)," 3GPP TS 36.213, V13.1.0, Part 5, Mar. 2016, 19 pages.
"3rd Generation Partnership Project; Technical Specification Group Radio Access Network; Evolved Universal Terrestrial Radio Access (E-UTRA); Physical layer procedures (Release 13)," 3GPP TS 36.213, V13.1.0, Part 6, Mar. 2016, 9 pages.
Foreign Communication From a Counterpart Application, PCT Application No. PCT/CN2016/078188, English Translation of International Search Report dated Jun. 21, 2016, 2 pages.
Foreign Communication From a Counterpart Application, PCT Application No. PCT/CN2016/078188, English Translation of Written Opinion dated Jun. 21, 2016, 7 pages.
Huawei, et al., "Discussions on DL/UL scheduling for LAA" R1-152476, XP050970933, 3GPP TSG RAN WG1 Meeting #81, Fukuoka, Japan, May 25-29, 2015, 4 pages.
Foreign Communication From a Counterpart Application, European Application No. 16896008.6, Extended European Search Report dated Feb. 12, 2019, 9 pages.
CMCC, "Discussion on issues related to PUSCH transmission for LAA" 3GPP TSG-RAN WG#84, St Julian's, Malta, R1-160495, Feb. 15-19, 2016, 4 pages.
Intel, et al., "Way forward on UL LBT," 3GPP TSG-RAN WG1#84, St. Julian's, Malta, R1-161379, Feb. 15-19, 2016, 5 pages.
Foreign Communication From a Counterpart Application, Japanese Application No. 2018-543329, Japanese Office Action dated Jul. 30, 2019, 6 pages.
Foreign Communication From a Counterpart Application, Japanese Application No. 2018-543329, English Translation of Japanese Office Action dated Jul. 30, 2019, 6 pages.
Foreign Communication From a Counterpart Application, Russian Application No. 2018134060, Russian Office Action and English Translation dated Jun. 7, 2019, 11 pages.

* cited by examiner

RADIO COMMUNICATIONS METHOD, BASE STATION, AND TERMINAL

CROSS-REFERENCE TO RELATED APPLICATIONS

This application is a U.S. National Stage of International Patent Application No. PCT/CN2016/078188 filed on Mar. 31, 2016, which is hereby incorporated by reference in its entirety.

TECHNICAL FIELD

Embodiments of the present invention relate to communications technologies, and in particular, to a radio communications method, a base station, and a terminal.

BACKGROUND

Licensed-assisted access using Long Term Evolution (Licensed-Assisted Access Using Long Term Evolution, LAA-LTE for short) specifically means that on a basis of deploying and operating an LTE system on licensed carriers, unlicensed carriers are introduced to share data traffic on the licensed carriers. The unlicensed carriers have advantages such as low costs, low admission requirements, and resource sharing. Specifically, a specific implementation of applying the unlicensed carriers to LTE includes the following: Based on carrier aggregation (Carrier Aggregation, CA for short) and dual connectivity (Dual Connectivity, DC for short) modes, when operation is performed in the carrier aggregation mode, a licensed carrier serves as a primary carrier (Pcell) and an unlicensed carrier serves as a secondary carrier (Scell). An uplink and a downlink may be both transmitted on a same unlicensed carrier. Specifically, transmission may be performed in a form of time division multiplexing (Time Division Multiplexing, TDM for short).

When a base station performs uplink and downlink data transmission by using an unlicensed carrier, first, the base station performs clear channel assessment (clear channel assessment) to preempt a channel, sends downlink data when detecting that the channel is idle, and performs uplink-downlink conversion after downlink data sending is completed; and a terminal performs CCA before sending uplink data, and then the terminal sends the uplink data. In the foregoing process, the base station may use a self-scheduling mode to schedule an uplink subframe for sending the uplink data. Specifically, downlink control information is sent in a downlink subframe on the unlicensed carrier, and the downlink control information includes an uplink scheduling indication for scheduling the uplink subframe. Specifically, one piece of downlink control information is sent in one downlink subframe, and one downlink subframe and one uplink subframe are correspondingly scheduled for the downlink control information. However, in a data transmission process, if a quantity of uplink subframes that need to be scheduled is greater than a quantity of downlink subframes that need to be scheduled, the self-scheduling mode can meet a requirement. To further meet various scheduling requirements, when the quantity of uplink subframes to be scheduled is greater than the quantity of downlink subframes to be scheduled, the downlink subframes may be scheduled by using self-scheduling on the unlicensed carrier, and the uplink subframes may be scheduled across carriers by using licensed carriers. Alternatively, the downlink subframes and some uplink subframes are scheduled by using self-scheduling on the unlicensed carrier, and remaining uplink subframes are scheduled across carriers by using licensed carriers.

However, in a process of scheduling uplink subframes in the foregoing manner, scheduling of one uplink subframe needs uplink scheduling indication information in one piece of downlink control information, and the base station usually needs to schedule a plurality of uplink subframes. Therefore, uplink scheduling indication information in a plurality of downlink subframes is needed, resulting in a problem of heavy signaling overheads between the base station and the terminal.

SUMMARY

Embodiments of the present invention provide a radio communications method, a base station, and a terminal, to reduce signaling overheads between the base station and the terminal in a subframe scheduling process.

According to a first aspect, an embodiment of the present invention provides a radio communications method, including:

sending, by a base station, downlink control information to a terminal, where the downlink control information includes uplink scheduling indication information, and the uplink scheduling indication information is used to instruct the terminal to send uplink data in a plurality of uplink subframes on one or more unlicensed carriers.

In this implementation, the base station sends the downlink control information to the terminal, where the downlink control information includes uplink scheduling indication information, and the uplink scheduling indication information is used to instruct the terminal to send uplink data in a plurality of uplink subframes on at least one unlicensed carrier, so that the terminal sends uplink data in a plurality of uplink subframes on one or more corresponding unlicensed carriers based on the uplink scheduling indication information, thereby implementing scheduling, by using uplink scheduling indication information in one piece of downlink control information, of the plurality of uplink subframes to perform uplink transmission. This increases a data volume in data transmission while effectively reducing scheduling signaling overheads.

With reference to the first aspect, in a possible implementation of the first aspect, the sending, by a base station, downlink control information to a terminal may specifically include: sending, by the base station, the downlink control information to the terminal by using an unlicensed carrier; or sending, by the base station, the downlink control information to the terminal by using a licensed carrier.

In this implementation, the base station may send the downlink control information to the terminal by using the unlicensed carrier, namely, perform scheduling by using a self-scheduling mode of the unlicensed carrier. Alternatively, the base station may perform cross-carrier scheduling by using licensed carriers. To be specific, the base station may flexibly select a carrier for sending control signaling. Sending the downlink control information by using the licensed carrier may further improve transmission reliability of the control signaling.

With reference to the first aspect or any of the foregoing possible implementation of the first aspect, in another possible implementation of the first aspect, the sending, by a base station, downlink control information to a terminal includes:

sending, by the base station, one piece of downlink control information to the terminal by using one downlink subframe.

To be specific, the base station sends, to the terminal by using one downlink subframe, one piece of downlink control information that is used to instruct the terminal to send uplink data in a plurality of uplink subframes on at least one unlicensed carrier.

With reference to the first aspect or any of the foregoing possible implementations of the first aspect, in another possible implementation of the first aspect, the sending, by a base station, downlink control information to a terminal includes:

sending, by the base station, a plurality of pieces of downlink control information to the terminal by using one downlink subframe, where a carrier corresponding to the downlink subframe includes an unlicensed carrier and a licensed carrier, each piece of downlink control information includes uplink scheduling indication information, and the uplink scheduling indication information is used to instruct the terminal to send uplink data in at least one uplink subframe on the at least one unlicensed carrier.

Optionally, one piece of downlink control information may also include a plurality of pieces of uplink scheduling indication information.

In this implementation, the base station sends a plurality of pieces of downlink control information by using one downlink subframe of different carriers, to schedule a plurality of uplink subframes; or sends a plurality of pieces of uplink scheduling indication information by using one piece of downlink control information, where one piece of uplink scheduling indication information is used to schedule one uplink subframe to perform uplink transmission, thereby scheduling a plurality of uplink subframes. This scheduling mode may implement more flexible scheduling.

With reference to the first aspect or any of the foregoing possible implementations of the first aspect, in another possible implementation of the first aspect, the method further includes:

sending, by the base station, radio resource control signaling to the terminal, where the radio resource control signaling includes system configuration information, and the system configuration information includes a quantity of consecutive uplink subframes and a start uplink subframe period; and the uplink scheduling indication information includes start uplink subframe location information and a start uplink subframe offset.

In this implementation, the base station performs uplink subframe scheduling in a manner of coordinating the RRC signaling with the uplink scheduling indication information, thereby effectively reducing signaling overheads and also effectively improving scheduling flexibility.

According to a second aspect, an embodiment of the present invention provides a radio communications method, including:

receiving, by a terminal, downlink control information sent by a base station, where the downlink control information includes uplink scheduling indication information; and sending, by the terminal, uplink data in a plurality of uplink subframes on at least one unlicensed carrier based on the uplink scheduling indication information.

With reference to the second aspect, in another possible implementation of the second aspect, the receiving, by a terminal, downlink control information sent by a base station includes:

receiving, by the terminal by using an unlicensed carrier, the downlink control information sent by the base station; or receiving, by the terminal by using a licensed carrier, the downlink control information sent by the base station.

With reference to the second aspect or any of the foregoing possible implementation of the second aspect, in another possible implementation of the second aspect, the receiving, by a terminal, downlink control information sent by a base station includes:

receiving, by the terminal by using one downlink subframe, a plurality of pieces of downlink control information sent by the base station, where a carrier corresponding to the downlink subframe includes an unlicensed carrier and a licensed carrier, and the downlink control information includes uplink scheduling indication information; and the sending, by the terminal, uplink data in a plurality of uplink subframes on at least one unlicensed carrier based on the uplink scheduling indication information includes:

sending, by the terminal, the uplink data separately in a plurality of uplink subframes on one unlicensed carrier based on the plurality of pieces of uplink scheduling indication information, where the uplink scheduling indication information is in a one-to-one correspondence to the uplink subframe.

With reference to any one of the second aspect or the foregoing possible implementations of the second aspect, in another possible implementation of the second aspect, the method further includes:

obtaining, by the terminal, uplink subframe start location information and a quantity of consecutive uplink subframes based on the uplink scheduling indication information; and the sending, by the terminal, uplink data in a plurality of uplink subframes on at least one unlicensed carrier based on the uplink scheduling indication information includes:

determining, by the terminal, a plurality of uplink subframes based on the uplink subframe start location and the quantity of consecutive uplink subframes; and sending, by the terminal, the uplink data in the plurality of uplink subframes.

With reference to any one of the second aspect or the foregoing possible implementations of the second aspect, in another possible implementation of the second aspect, the method further includes:

obtaining, by the terminal, a start uplink subframe period and a start uplink subframe offset based on the uplink scheduling indication information; and the sending, by the terminal, uplink data in a plurality of uplink subframes on at least one unlicensed carrier based on the uplink scheduling indication information includes:

determining, by the terminal, a plurality of uplink subframes based on the uplink subframe start location, the quantity of consecutive uplink subframes, the start uplink subframe period, and the start uplink subframe offset; and sending, by the terminal, the uplink data in the plurality of uplink subframes.

With reference to any one of the second aspect or the foregoing possible implementations of the second aspect, in another possible implementation of the second aspect, the method further includes:

obtaining, by the terminal, a carrier index based on the uplink scheduling indication information; and the sending, by the terminal, uplink data in a plurality of uplink subframes on at least one unlicensed carrier based on the uplink scheduling indication information includes:

determining, by the terminal, a plurality of uplink subframes on a plurality of unlicensed carriers based on the uplink subframe start location, the quantity of consecutive uplink subframes, and the carrier index; and sending, by the terminal, the uplink data in the plurality of uplink subframes on the plurality of unlicensed carriers.

With reference to the second aspect or any of the foregoing possible implementations of the second aspect, in another possible implementation of the second aspect, the uplink scheduling indication information includes start uplink subframe location information and a start uplink subframe offset, and the method further includes:

receiving, by the terminal, radio resource control signaling sent by the base station, where the radio resource control signaling includes system configuration information; and obtaining, by the terminal, a quantity of consecutive uplink subframes and a start uplink subframe period based on the system configuration information; and the sending, by the terminal, uplink data in a plurality of uplink subframes on at least one unlicensed carrier based on the uplink scheduling indication information includes:

sending, by the terminal, the uplink data in the plurality of uplink subframes on the at least one unlicensed carrier based on the radio resource control signaling and the uplink scheduling indication information.

According to a third aspect, an embodiment of the present invention provides a base station, including:

a sending module, configured to send downlink control information generated by a processing module to a terminal, where the downlink control information includes uplink scheduling indication information, and the uplink scheduling indication information is used to instruct the terminal to send uplink data in a plurality of uplink subframes on at least one unlicensed carrier.

With reference to the third aspect, in a possible implementation of the third aspect, the sending module is specifically configured to:

send the downlink control information to the terminal by using an unlicensed carrier; or send the downlink control information to the terminal by using a licensed carrier.

With reference to the third aspect or any of the foregoing possible implementation of the third aspect, in another possible implementation of the third aspect, the sending module is specifically configured to:

send one piece of downlink control information to the terminal by using one downlink subframe.

With reference to the third aspect or any of the foregoing possible implementations of the third aspect, in another possible implementation of the third aspect, the sending module is specifically configured to send a plurality of pieces of downlink control information to the terminal by using one downlink subframe, where a carrier corresponding to the downlink subframe includes an unlicensed carrier and a licensed carrier, each piece of downlink control information includes uplink scheduling indication information, and the uplink scheduling indication information is used to instruct the terminal to send uplink data in at least one uplink subframe on the at least one unlicensed carrier.

With reference to the third aspect or any of the foregoing possible implementations of the third aspect, in another possible implementation of the third aspect, the sending module is further configured to send radio resource control signaling generated by the processing module to the terminal, where the radio resource control signaling includes system configuration information, and the system configuration information includes a quantity of consecutive uplink subframes and a start uplink subframe period; and the uplink scheduling indication information includes start uplink subframe location information and a start uplink subframe offset.

According to a fourth aspect, an embodiment of the present invention provides a terminal, including:

a receiving module, configured to receive downlink control information sent by a base station, where the downlink control information includes uplink scheduling indication information; and a processing module, configured to send uplink data in a plurality of uplink subframes on at least one unlicensed carrier based on the uplink scheduling indication information.

With reference to the fourth aspect, in another possible implementation of the fourth aspect, the receiving module is specifically configured to:

receive, by using an unlicensed carrier, the downlink control information sent by the base station; or receive, by using a licensed carrier, the downlink control information sent by the base station.

With reference to the fourth aspect or any of the foregoing possible implementation of the fourth aspect, in another possible implementation of the fourth aspect, the receiving module is specifically configured to receive, by using one downlink subframe, a plurality of pieces of downlink control information sent by the base station, where a carrier corresponding to the downlink subframe includes an unlicensed carrier and a licensed carrier, and each piece of downlink control information includes uplink scheduling indication information; and the processing module is specifically configured to send uplink data separately in a plurality of uplink subframes on one unlicensed carrier based on the plurality of pieces of uplink scheduling indication information, where the uplink scheduling indication information is in a one-to-one correspondence to the uplink subframe.

With reference to any one of the fourth aspect or the foregoing possible implementations of the fourth aspect, in another possible implementation of the fourth aspect, the processing module is further configured to obtain uplink subframe start location information and a quantity of consecutive uplink subframes based on the uplink scheduling indication information; and that the processing module is configured to send uplink data in a plurality of uplink subframes on at least one unlicensed carrier based on the uplink scheduling indication information includes:

determining a plurality of uplink subframes based on the uplink subframe start location and the quantity of consecutive uplink subframes; and sending the uplink data in the plurality of uplink subframes.

With reference to any one of the fourth aspect or the foregoing possible implementations of the fourth aspect, in another possible implementation of the fourth aspect, the processing module is further configured to obtain a start uplink subframe period and a start uplink subframe offset based on the uplink scheduling indication information; and that the processing module is configured to send uplink data in a plurality of uplink subframes on at least one unlicensed carrier based on the uplink scheduling indication information includes:

determining a plurality of uplink subframes based on the uplink subframe start location, the quantity of consecutive uplink subframes, the start uplink subframe period, and the start uplink subframe offset; and sending the uplink data in the plurality of uplink subframes.

With reference to any one of the fourth aspect or the foregoing possible implementations of the fourth aspect, in another possible implementation of the fourth aspect, the processing module is further configured to obtain a carrier index based on the uplink scheduling indication information; and that the processing module is configured to send uplink data in a plurality of uplink subframes on at least one unlicensed carrier based on the uplink scheduling indication information includes:

determining a plurality of uplink subframes on a plurality of unlicensed carriers based on the uplink subframe start location, the quantity of consecutive uplink subframes, and the carrier index; and sending the uplink data in the plurality of uplink subframes on the plurality of unlicensed carriers.

With reference to any one of the fourth aspect or the foregoing possible implementations of the fourth aspect, in another possible implementation of the fourth aspect, the uplink scheduling indication information includes start uplink subframe location information and a start uplink subframe offset, and the receiving module is further configured to receive radio resource control signaling sent by the base station, where the radio resource control signaling includes system configuration information;

the processing module is further configured to obtain a quantity of consecutive uplink subframes and a start uplink subframe period based on the system configuration information; and that the processing module is configured to send uplink data in a plurality of uplink subframes on at least one unlicensed carrier based on the uplink scheduling indication information includes:

sending the uplink data in the plurality of uplink subframes on the at least one unlicensed carrier based on the radio resource control signaling and the uplink scheduling indication information.

According to a fifth aspect, an embodiment of the present invention provides a base station, where the base station includes a transceiver, a memory, a bus system, and at least one processor; the transceiver, the memory, and the at least one processor are connected by using the bus system; and the memory stores one or more programs, the one or more programs include an instruction, and when the instruction is executed by the base station, the base station performs the method according to any one of the first aspect or the possible implementations of the first aspect.

According to a sixth aspect, an embodiment of the present invention provides a terminal, where the terminal includes a transceiver, a memory, a bus system, and at least one processor; the transceiver, the memory, and the at least one processor are connected by using the bus system; and the memory stores one or more programs, the one or more programs include an instruction, and when the instruction is executed by the terminal, the terminal performs the method according to any one of the second aspect or the possible implementations of the second aspect.

With reference to any of the foregoing aspects or any possible implementation of the foregoing any aspect, the uplink scheduling indication information includes start uplink subframe location information and a quantity of consecutive uplink subframes.

With reference to any of the foregoing aspects or any possible implementation of the foregoing any aspect, the uplink scheduling indication information further includes a start uplink subframe period and a start uplink subframe offset.

With reference to any of the foregoing aspects or any possible implementation of the foregoing any aspect, the uplink scheduling indication information further includes a carrier index.

With reference to any of the foregoing aspects or any possible implementation of the foregoing any aspect, a difference between an index of the downlink subframe for sending the uplink scheduling indication information and an index of the scheduled uplink subframe is a variable value and is an integer.

With reference to any of the foregoing aspects or any possible implementation of the foregoing any aspect, the scheduled uplink subframe and the downlink subframe for sending the downlink control information fall within a same maximum channel occupancy time MCOT.

According to the radio communications method, the base station, and the terminal in the embodiments of the present invention, the base station sends downlink control information to the terminal, where the downlink control information includes uplink scheduling indication information, and the uplink scheduling indication information is used to instruct the terminal to send uplink data in a plurality of uplink subframes on at least one unlicensed carrier, so that the terminal sends uplink data in a plurality of uplink subframes on one or more corresponding unlicensed carriers based on the uplink scheduling indication information, thereby implementing scheduling, by using uplink scheduling indication information in one piece of downlink control information, of the plurality of uplink subframes to perform uplink transmission. This increases a data volume in data transmission while effectively reducing scheduling signaling overheads.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Figure 1:
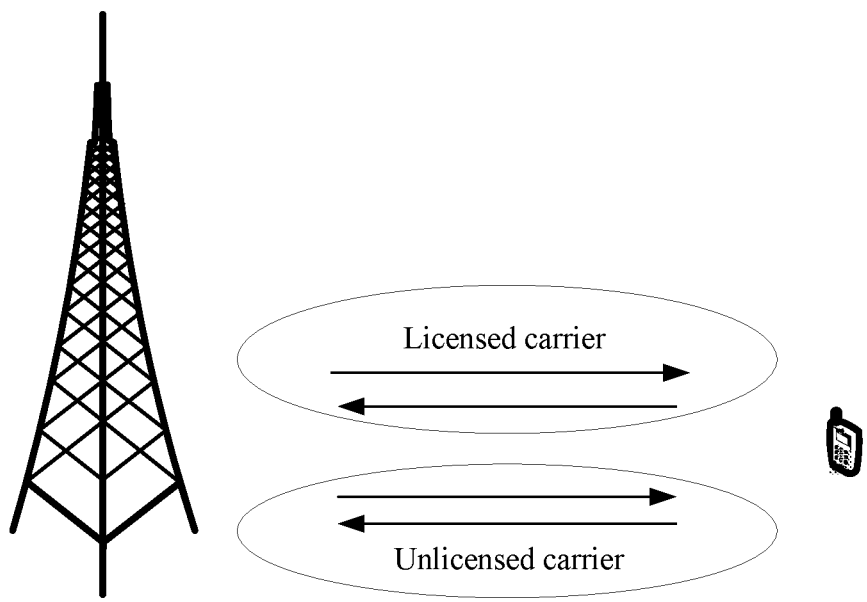
FIG. 1 is a schematic diagram of communication between a terminal and a base station.

An embodiment of the present invention discloses a radio communications method, and specifically, relates to an uplink scheduling method. This embodiment of the present invention may be applied to a radio communications system, for example, an LAA-LTE system. FIG. 1 is a schematic diagram of communication between a terminal and a base station. As shown in FIG. 1, the base station and the terminal may exchange data by using a licensed carrier and an unlicensed carrier. Both the licensed carrier and the unlicensed carrier can be used to send uplink and downlink data, and both the licensed carrier and the unlicensed carrier can be used to send control signaling and service data. A frequency band of the unlicensed carrier is not licensed by related authorities for a specific system, and has features such as free of charge and sharing. Using the 5 GHz frequency band as an example, carriers of this frequency band are mainly used to transmit signals of WI-FI, BLUETOOTH, and a medical system. Use of the unlicensed carrier in an LTE system (namely, LAA-LTE) may effectively improve a data throughput of the LTE system. This embodiment of the present invention is used to reduce signaling overheads in an uplink subframe scheduling process in the LAA-LTE system.

Figure 2:
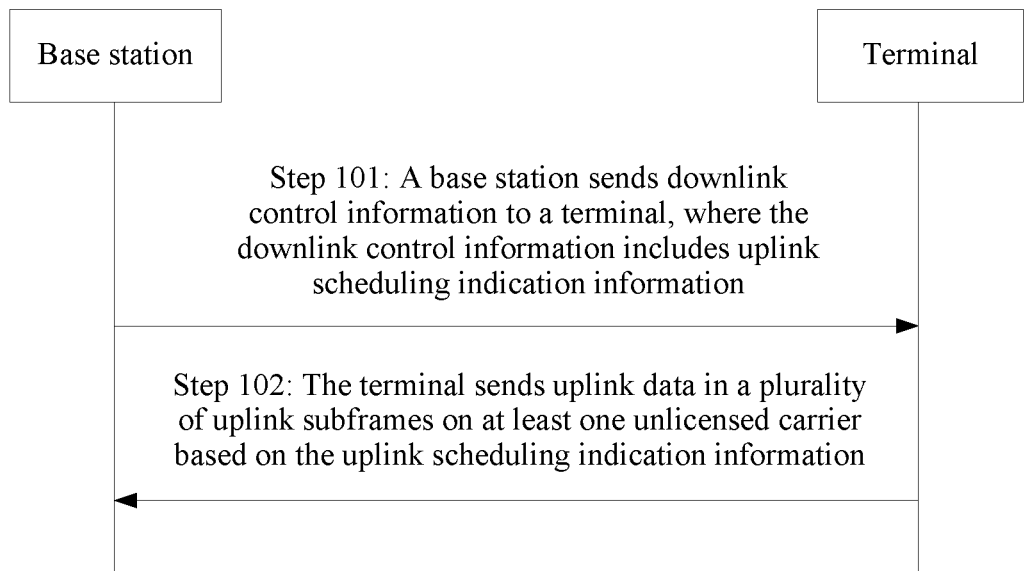
FIG. 2 is a signaling interaction diagram of a first embodiment of a radio communications method according to the present invention.
Figure 3:
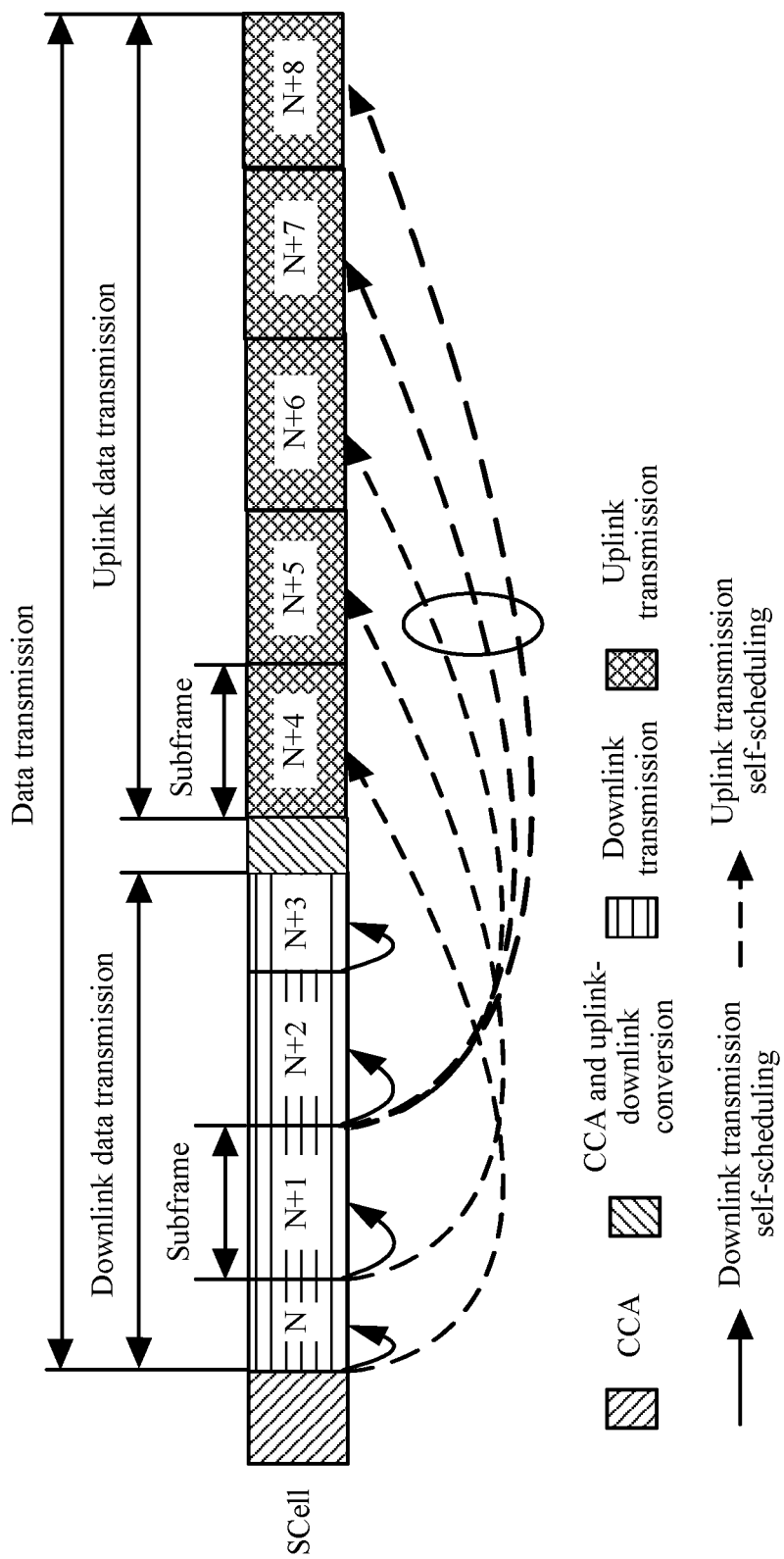
FIG. 3 is a schematic diagram of an uplink subframe scheduling mode according to the present invention.
Figure 4:
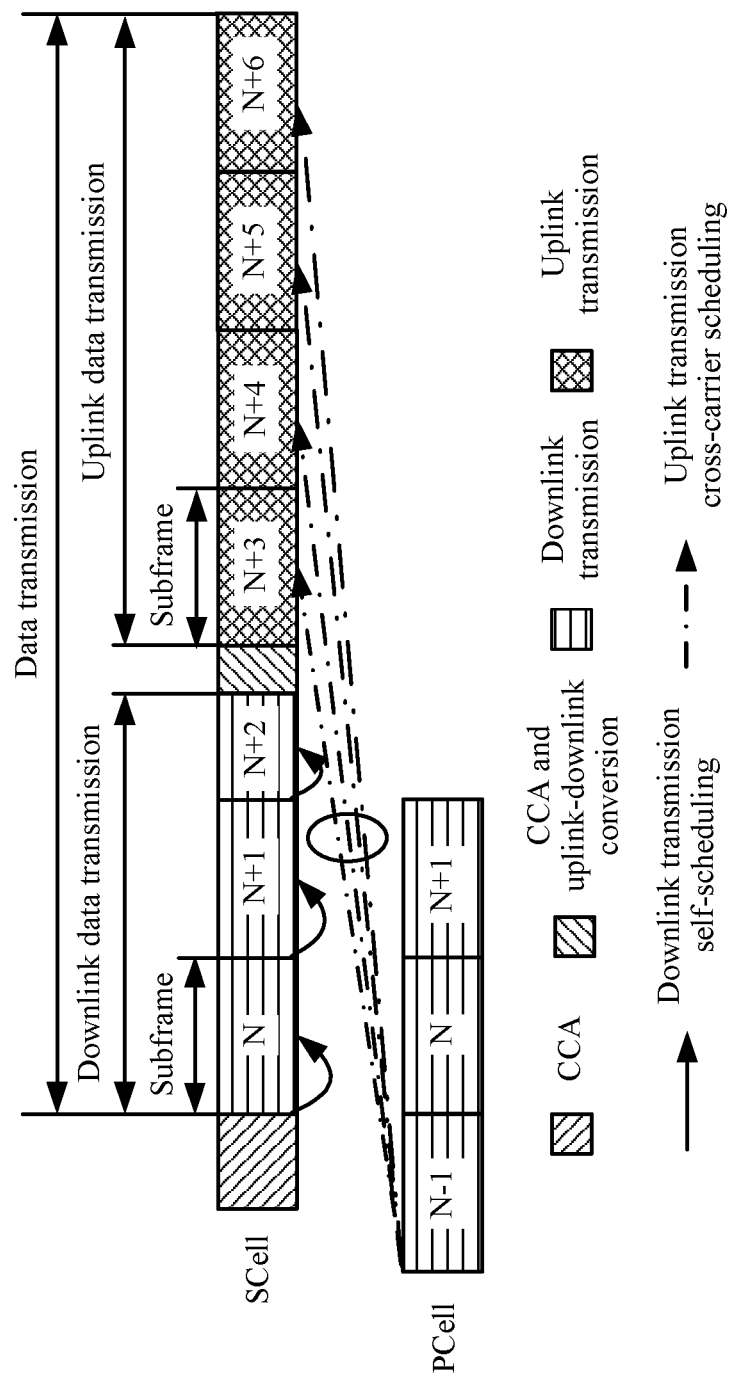
FIG. 4 is a schematic diagram of another uplink subframe scheduling mode according to the present invention.
Figure 5:
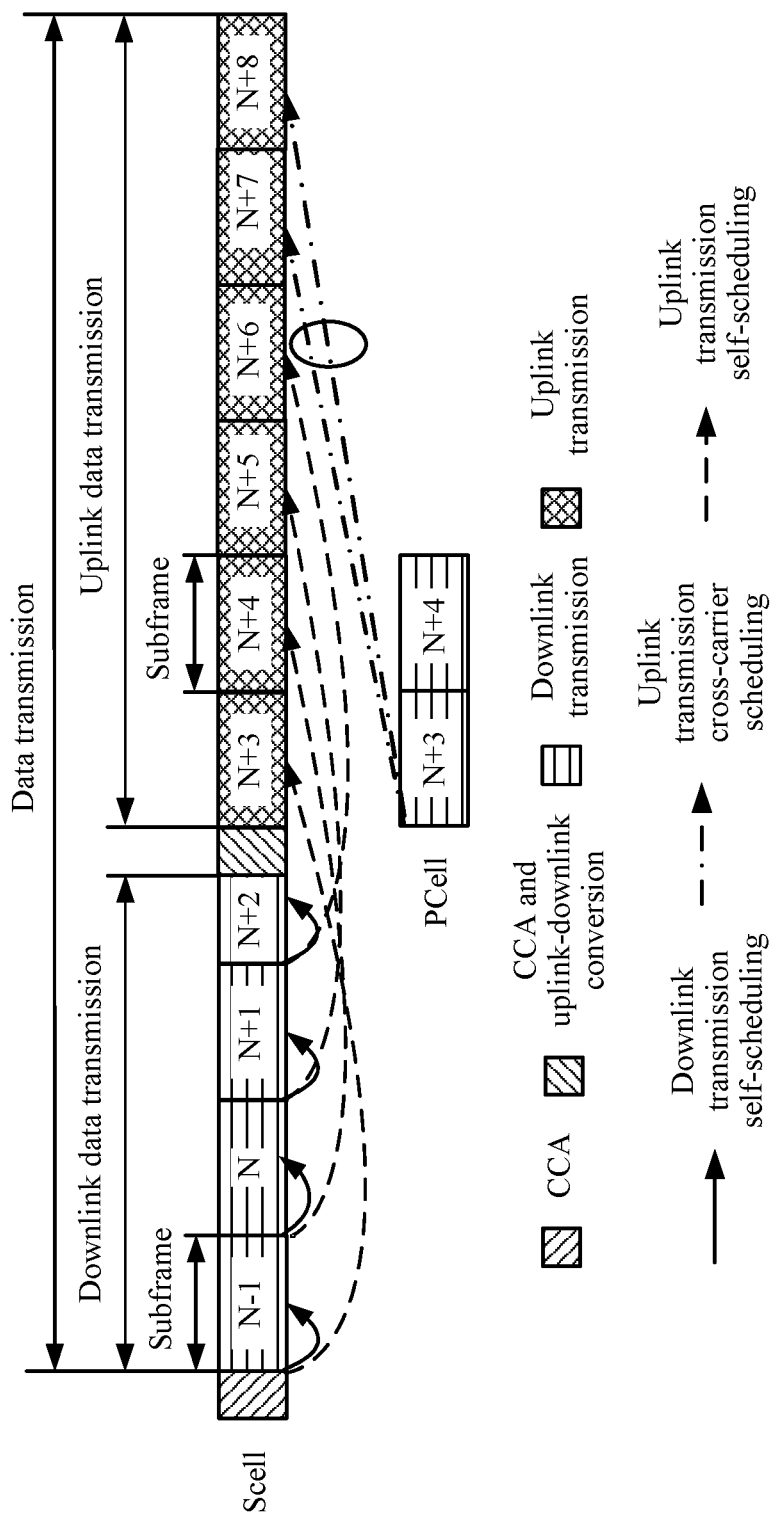
FIG. 5 is a schematic diagram of still another uplink subframe scheduling mode according to the present invention.
Figure 6:
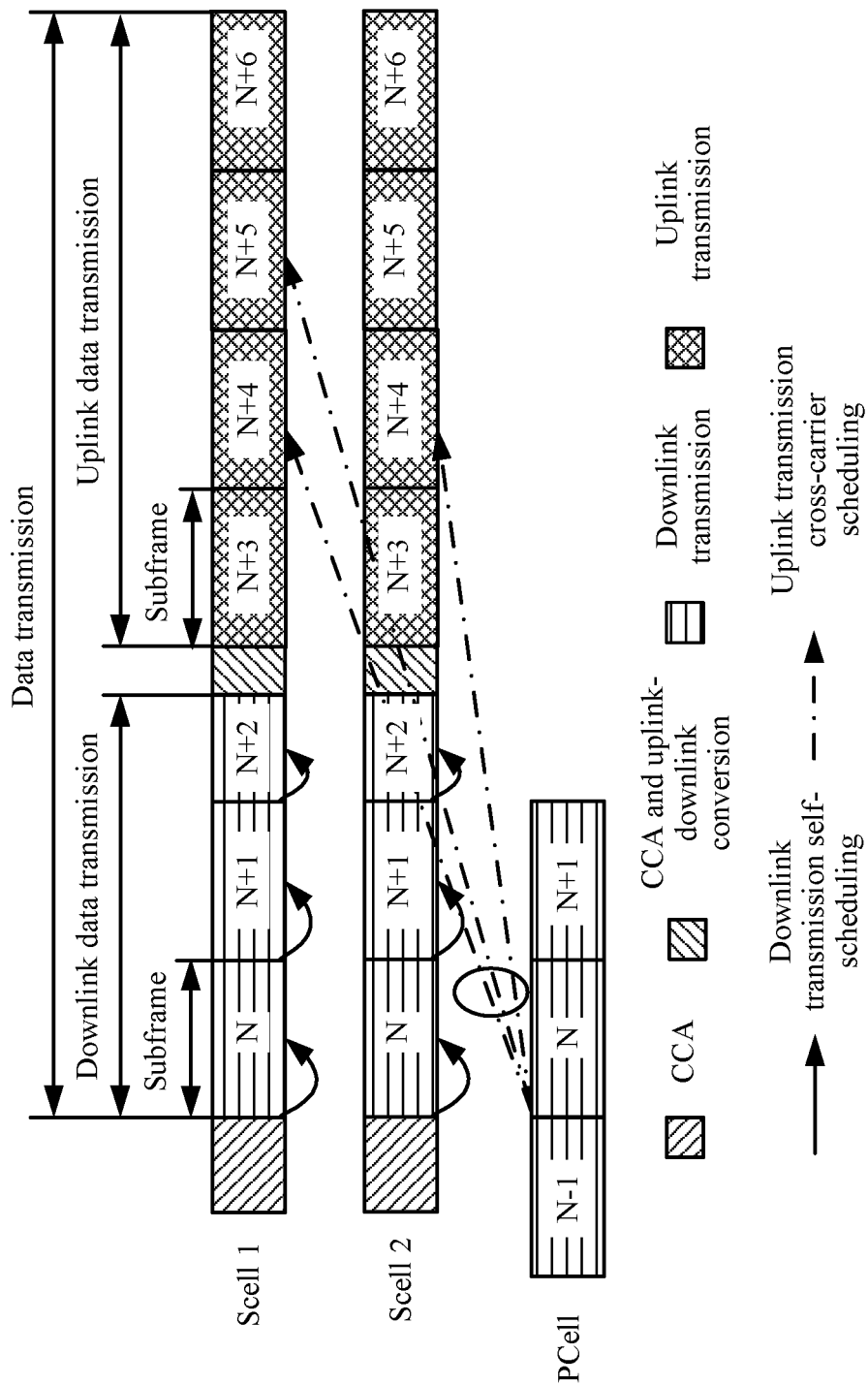
FIG. 6 is a schematic diagram of yet another uplink subframe scheduling mode according to the present invention.

FIG. 2 is a signaling interaction diagram of a first embodiment of a radio communications method according to the present invention. FIG. 3 is a schematic diagram of an uplink subframe scheduling mode according to the present invention. FIG. 4 is a schematic diagram of another uplink subframe scheduling mode according to the present invention. FIG. 5 is a schematic diagram of still another uplink subframe scheduling mode according to the present invention. FIG. 6 is a schematic diagram of yet another uplink subframe scheduling mode according to the present invention. As shown in FIG. 2, the method of this embodiment may include the following steps:

Step 101: A base station sends downlink control information to a terminal, where the downlink control information includes uplink scheduling indication information.

Specifically, the base station may generate the downlink control information based on a data scheduling requirement. The downlink control information may include downlink scheduling indication information and the uplink scheduling indication information. To be specific, both uplink and downlink scheduling indications are notified to the terminal by using the downlink control information, so that the terminal receives, in a corresponding downlink subframe, downlink data sent by the base station; and sends, in a corresponding uplink subframe, uplink data to the base station.

Step 102: The terminal sends uplink data in a plurality of uplink subframes on at least one unlicensed carrier based on the uplink scheduling indication information.

Specifically, the downlink control information includes the uplink scheduling indication information for scheduling a plurality of uplink subframes on one or more unlicensed carriers. Therefore, the terminal obtains the uplink scheduling indication information through parsing, and sends the uplink data in an uplink subframe on a corresponding carrier based on the uplink scheduling indication information.

In a feasible implementation of step 101, the base station may specifically send the downlink control information to the terminal by using an unlicensed carrier. The downlink control information is used to schedule a plurality of uplink subframes on the unlicensed carrier. For details, refer to FIG. 3. As shown in FIG. 3, an unlicensed carrier (SCell) is used to perform downlink transmission and uplink transmission in different subframes. To be specific, the base station uses the unlicensed carrier to send control information, to schedule a downlink subframe and an uplink subframe on the unlicensed carrier. In other words, the base station uses a self-scheduling mode. As shown in FIG. 3, the base station first performs CCA on the unlicensed carrier, and then sends downlink control information by using the unlicensed carrier, to implement scheduling of a downlink subframe and an uplink subframe. Specifically, the base station sends one piece of downlink control information in a subframe N on the unlicensed carrier. The downlink control information is used to schedule the subframe N to send downlink data and used to schedule a subframe N+4 to perform uplink transmission. The base station sends another piece of downlink control information in a subframe N+1 on the unlicensed carrier. The downlink control information is used to schedule the subframe N+1 to send downlink data and used to schedule a subframe N+5 to perform uplink transmission. The base station sends another piece of downlink control information in a subframe N+2 on the unlicensed carrier. Unlike the downlink control information in the subframe N and the subframe N+1, the downlink control information in the subframe N+2 is used to schedule the subframe N+2 to send downlink data and used to schedule a subframe N+6, a subframe N+7, and a subframe N+8 to perform uplink transmission. It should be noted that the three scheduled subframes may be inconsecutive, and locations of the scheduled subframes may be flexibly configured as required.

In another feasible implementation of step 101, the base station may specifically send the downlink control information to the terminal by using a licensed carrier. The downlink control information is used to schedule a plurality of uplink subframes on an unlicensed carrier. For details, refer to FIG. 4. As shown in FIG. 4, an unlicensed carrier (SCell) is used to perform downlink transmission and uplink transmission in different subframes. Specifically, the base station first performs CCA on the unlicensed carrier, and then sends downlink control information by using the unlicensed carrier. The downlink control information sent by using the unlicensed carrier is only used to schedule a subframe on the unlicensed carrier to perform downlink transmission. As shown in FIG. 4, downlink control information is sent in a subframe N on the unlicensed carrier. The downlink control information in the subframe N is only used to schedule the subframe N to perform downlink transmission. A subframe N+1 on the unlicensed carrier is used to schedule the subframe N+1 to perform downlink transmission. Uplink subframe scheduling may be implemented by sending downlink control information in a subframe N−1 by using a licensed carrier (PCell). The downlink control information in the subframe N−1 is used to schedule a subframe N+3, a subframe N+4, a subframe N+5, and a subframe N+6 on the unlicensed carrier to perform uplink transmission. In other words, the uplink subframe scheduling is performed in a cross-carrier scheduling mode. It should be noted that FIG. 4 is merely an example for illustrative description. Both a specific subframe in which cross-carrier uplink subframe scheduling is performed on a licensed carrier and (a quantity and locations of) specific subframes to be scheduled to perform uplink transmission on an unlicensed carrier can be flexibly configured as required.

In still another feasible implementation of step 101, the base station may specifically send the downlink control information to the terminal by using a licensed carrier. The downlink control information is used to schedule some uplink subframes on an unlicensed carrier. For details, refer to FIG. 5. As shown in FIG. 5, an unlicensed carrier (SCell) is used to perform downlink transmission and uplink transmission in different subframes. Specifically, the base station first performs CCA on the unlicensed carrier, and then sends downlink control information by using the unlicensed carrier. The downlink control information sent by using the unlicensed carrier is used to schedule a subframe on the unlicensed carrier to perform downlink transmission and schedule a subframe on the unlicensed carrier to perform uplink transmission. As shown in FIG. 5, downlink control information is sent in a subframe N−1 on the unlicensed carrier. The downlink control information in the subframe N−1 is used to schedule the subframe N−1 to perform downlink transmission and used to schedule a subframe N+3 to perform uplink transmission. A subframe N on the unlicensed carrier is used to schedule the subframe N to perform downlink transmission and used to schedule a subframe N+4 to perform uplink transmission; and so on, until a subframe N+2 on the unlicensed carrier is used to schedule the subframe N+2 to perform downlink transmission and used to schedule a subframe N+6 to perform uplink transmission. In this way, after downlink subframe scheduling is completed, there are still a subframe N+7 and a subframe N+8 on the unlicensed carrier that need to be scheduled. Then, the base station may send downlink control information in the subframe N+3 by using a licensed carrier (PCell), to schedule the subframe N+7 and the subframe N+8 on the unlicensed carrier (SCell) to perform uplink transmission. It should be noted that FIG. 5 is merely an example for illustrative description. Both a specific subframe in which cross-carrier uplink subframe scheduling is performed on a licensed carrier and (a quantity and locations of) specific subframes to be scheduled to perform uplink transmission on an unlicensed carrier can be flexibly configured as required.

In still another feasible implementation of step 101, the base station may specifically send the downlink control information to the terminal by using a licensed carrier. The downlink control information is used to schedule uplink subframes on different unlicensed carriers. For details, refer to FIG. 6. As shown in FIG. 6, an unlicensed carrier (SCell) is used to perform downlink transmission and uplink transmission in different subframes. Specifically, the base station first performs CCA on the unlicensed carrier, and then sends downlink control information by using the unlicensed carrier. The downlink control information sent by using the unlicensed carrier is only used to schedule a subframe on the unlicensed carrier to perform downlink transmission. As shown in FIG. 6, downlink control information is separately sent in a subframe N on an unlicensed carrier 1 (SCell 1) and a subframe N on an unlicensed carrier 2 (SCell 2). The downlink control information in the subframes N on the two unlicensed carriers is used to schedule respective subframes N to perform downlink transmission. Subframes N+1 on the unlicensed carrier 1 and the unlicensed carrier 2 are used to schedule respective subframes N+1 to perform downlink transmission, and subframes N+2 on the unlicensed carrier 1 and the unlicensed carrier 2 are used to schedule respective subframes N+2 to perform downlink transmission. In this way, after downlink subframe scheduling is completed, there are still subframes N+4 on the unlicensed carrier 1 and the unlicensed carrier 2 and a subframe N+5 on the unlicensed carrier 1 that need to be scheduled. Then, the base station may send downlink control information by using a subframe N on a licensed carrier (PCell), to schedule the subframes N+4 on the unlicensed carrier 1 and the unlicensed carrier 2 and the subframe N+5 on the unlicensed carrier 1 to perform uplink transmission. It should be noted that FIG. 6 is merely an example for illustrative description. Both a specific subframe in which cross-carrier uplink subframe scheduling is performed on a licensed carrier and (a quantity and locations of) specific subframes to be scheduled on an unlicensed carrier can be flexibly configured as required.

A difference between an index of the downlink subframe for sending the uplink scheduling indication information and an index of the scheduled uplink subframe is a variable value and is an integer. For example, as shown in FIG. 6, an interval between the subframe N for sending uplink scheduling indication information on the licensed carrier and the scheduled subframe N+4 on the unlicensed carrier is 4, and an interval between the subframe N for sending uplink scheduling indication information on the licensed carrier and the scheduled subframe N+5 on the unlicensed carrier is 5.

Specifically, the scheduled uplink subframe and the downlink subframe for sending the downlink control information fall within a same maximum channel occupancy time (MCOT).

In this embodiment, the base station sends the downlink control information to the terminal, where the downlink control information includes uplink scheduling indication information, and the uplink scheduling indication information is used to instruct the terminal to send uplink data in a plurality of uplink subframes on at least one unlicensed carrier, so that the terminal sends uplink data in a plurality of uplink subframes on one or more corresponding unlicensed carriers based on the uplink scheduling indication information, thereby implementing scheduling, by using uplink scheduling indication information in one piece of downlink control information, of the plurality of uplink subframes to perform uplink transmission. This increases a data volume in data transmission while effectively reducing scheduling signaling overheads.

The following describes in detail the uplink scheduling indication information in the technical solutions of the foregoing method embodiment by using some specific embodiments.

Figure 7:
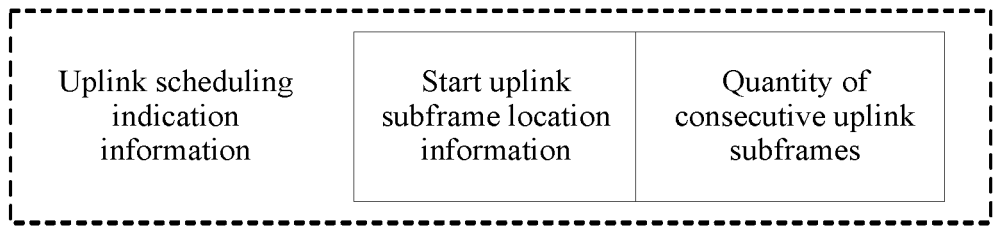
FIG. 7 is a schematic structural diagram of a type of uplink scheduling indication information according to the present invention.

FIG. 7 is a schematic structural diagram of a type of uplink scheduling indication information according to the present invention. As shown in FIG. 7, the uplink scheduling indication information in this embodiment may include start uplink subframe location information and a quantity of consecutive uplink subframes. Specifically, the uplink scheduling indication information shown in FIG. 7 may be specifically applied to scheduling of consecutive subframes. For example, in the scheduling scenario shown in FIG. 3, that is, when the subframe N+2 on the unlicensed carrier is used to schedule the subframe N+6, the subframe N+7, and the subframe N+8 to perform uplink transmission, a structure of the uplink scheduling indication information in the embodiment shown in FIG. 7 may be used. The uplink scheduling indication information only needs to carry start uplink subframe location information (the subframe N+6) and a quantity (3) of consecutive uplink subframes. It should be noted that, the uplink scheduling indication information shown in FIG. 7 may be an index of a default carrier. In this case, when a terminal obtains, through parsing, an index that does not carry a carrier, a carrier for sending uplink data and a carrier for receiving the uplink scheduling indication information may be considered as a same carrier. The start uplink subframe location information may be specifically a start uplink subframe index (start subframe index).

Figure 8:
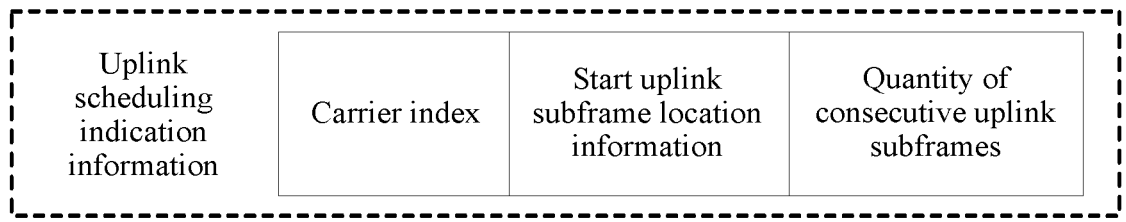
FIG. 8 is a schematic structural diagram of another type of uplink scheduling indication information according to the present invention.

FIG. 8 is a schematic structural diagram of another type of uplink scheduling indication information according to the present invention. As shown in FIG. 8, the uplink scheduling indication information in this embodiment is based on the structure shown in FIG. 7, and may further include a carrier index. A terminal may determine, based on the carrier index, a carrier corresponding to a subframe for performing uplink transmission, so that uplink data transmission is performed on the corresponding subframe. For example, in the scheduling scenario shown in FIG. 4, that is, when the uplink scheduling indication information is sent in the subframe N+1 on the licensed carrier (PCell), where the uplink scheduling indication information in the subframe N+1 is used to schedule the subframe N+3, the subframe N+4, the subframe N+5, and the subframe N+6 on the unlicensed carrier to perform uplink transmission, a structure of the uplink scheduling indication information in the embodiment shown in FIG. 8 may be used. The uplink scheduling indication information needs to carry a carrier index (an index of the PCell), start uplink subframe location information (the subframe N+3), and a quantity (4) of consecutive uplink subframes.

Figure 9:
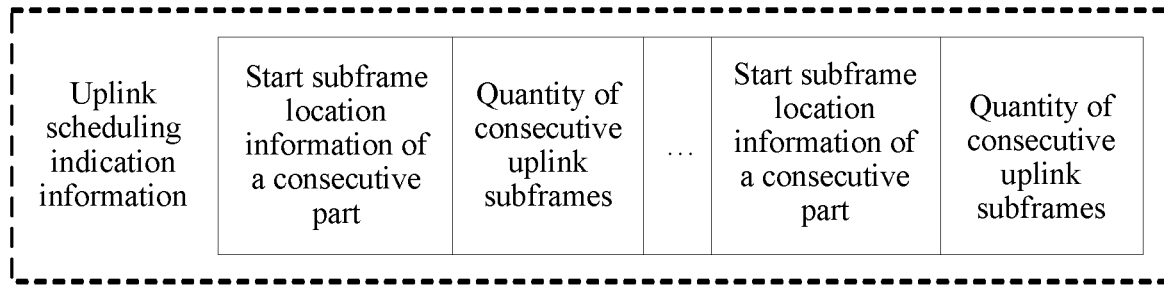
FIG. 9 is a schematic structural diagram of still another type of uplink scheduling indication information according to the present invention.

FIG. 9 is a schematic structural diagram of still another type of uplink scheduling indication information according to the present invention. The uplink scheduling indication information shown in FIG. 7 and FIG. 8 is used to schedule consecutive subframes. Inconsecutive subframes may be scheduled by using a structure of the uplink scheduling indication information shown in FIG. 9. As shown in FIG. 9, the uplink scheduling indication information in this embodiment may include start subframe location information and a quantity of consecutive subframes of each continuous part. For example, when a subframe N on an unlicensed carrier is used to schedule a subframe N+5, a subframe N+6, and a subframe N+8, uplink scheduling indication information in the subframe N on the unlicensed carrier may include start uplink subframe location information (N+5) and a quantity (2) of consecutive subframes of a first continuous part and start uplink subframe location information (N+8) and a quantity (0) of consecutive subframes of a second continuous part. The foregoing manner may be used for scheduling of more subframes. Details are not described one by one herein.

Figure 10:
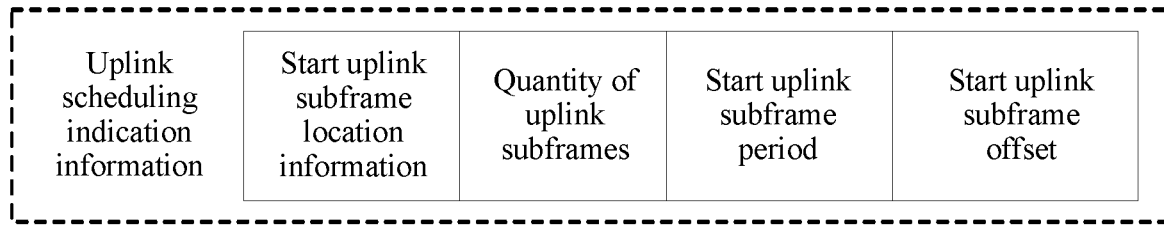
FIG. 10 is a schematic structural diagram of yet another type of uplink scheduling indication information according to the present invention.

FIG. 10 is a schematic structural diagram of yet another type of uplink scheduling indication information according to the present invention. Different from the structure of the uplink scheduling indication information shown in FIG. 9, the uplink scheduling indication information in this embodiment is used to indicate scheduling of subframes with fixed-interval start locations. As shown in FIG. 10, the uplink scheduling indication information in this embodiment may include start uplink subframe location information, a quantity of uplink subframes, a start uplink subframe period (start subframe period), and a start uplink subframe offset (start subframe offset). For example, when a subframe N on an unlicensed carrier is used to schedule a subframe N+5, a subframe N+6, a subframe N+8, and a subframe N+9, uplink scheduling indication information in the subframe N on the unlicensed carrier may include start uplink subframe location information (N+4), a quantity (2) of uplink subframes, a start uplink subframe period (3), and a start uplink subframe offset (1). The foregoing manner may be used for scheduling of more subframes. Details are not described one by one herein.

It should be noted that when inconsecutive subframes on different carriers need to be scheduled to perform uplink transmission, on a basis of the uplink scheduling indication information shown in FIG. 9 and FIG. 10, uplink scheduling indication information may further include a carrier index, to instruct to perform uplink transmission in a subframe on a corresponding carrier.

Figure 11A:
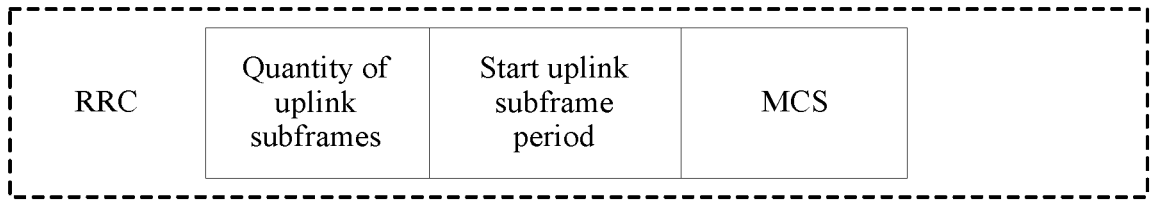
FIG. 11A is a schematic structural diagram of a type of RRC signaling according to the present invention.
Figure 11B:
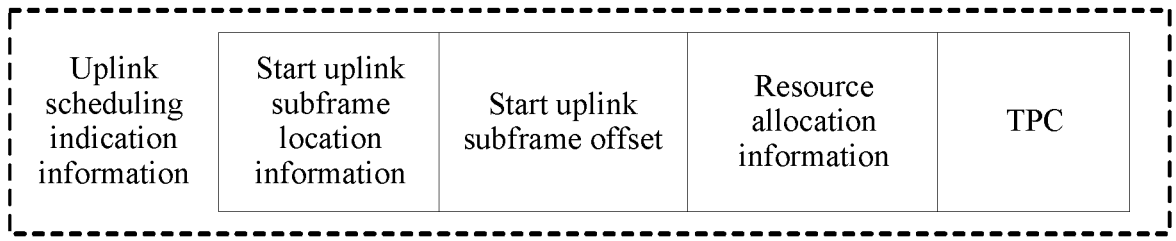
FIG. 11B is a schematic structural diagram of yet another type of uplink scheduling indication information according to the present invention.

FIG. 11A is a schematic structural diagram of a type of RRC signaling according to the present invention, and FIG. 11B is a schematic structural diagram of yet another type of uplink scheduling indication information according to the present invention. Different from the structure of the uplink scheduling indication information shown in FIG. 9, the uplink scheduling indication information in this embodiment is only used to carry a part of uplink scheduling indication parameters (relatively dynamic parameters), and a remaining part of the uplink scheduling indication parameters (relatively static parameters) are sent to a terminal by using RRC signaling. Specifically, as shown in FIG. 11A and FIG. 11B, an uplink scheduling indication parameter may be sent in a manner of combining the RRC signaling and the uplink scheduling indication information, so that the terminal can learn of, based on the RRC signaling and the uplink scheduling indication information, a subframe that can be used to send uplink data. Specifically, the RRC signaling may include a quantity of consecutive uplink subframes and a start uplink subframe period. Correspondingly, the uplink scheduling indication information may include start uplink subframe location information and a start uplink subframe offset. Further, the RRC signaling may further include parameter information such as an MCS (Modulation and Coding Scheme, modulation and coding scheme), and the uplink scheduling indication information may further include parameter information such as resource allocation information and TPC (Transmission Power Control, Transmission Power Control).

Figure 12:
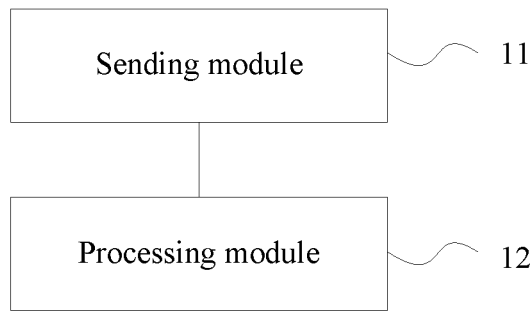
FIG. 12 is a schematic structural diagram of a first embodiment of a base station according to the present invention.

FIG. 12 is a schematic structural diagram of a first embodiment of a base station according to the present invention. As shown in FIG. 12, the apparatus in this embodiment may include a sending module 11 and a processing module 12. The sending module 11 is configured to send downlink control information generated by the processing module 12 to a terminal, where the downlink control information includes uplink scheduling indication information, and the uplink scheduling indication information is used to instruct the terminal to send uplink data in a plurality of uplink subframes on at least one unlicensed carrier.

Optionally, the sending module 11 is specifically configured to send the downlink control information to the terminal by using an unlicensed carrier; or send the downlink control information to the terminal by using a licensed carrier.

Optionally, the sending module is specifically configured to send a plurality of pieces of downlink control information to the terminal by using one downlink subframe, where a carrier corresponding to the downlink subframe includes an unlicensed carrier and a licensed carrier, the downlink control information includes a plurality of pieces of uplink scheduling indication information, and the uplink scheduling indication information is used to instruct the terminal to send uplink data in one uplink subframe on one unlicensed carrier.

The sending module 11 is further configured to send radio resource control signaling generated by the processing module 12 to the terminal, where the radio resource control signaling includes system configuration information, and the system configuration information includes a quantity of consecutive uplink subframes and a start uplink subframe period, and the uplink scheduling indication information includes start uplink subframe location information and a start uplink subframe offset.

The apparatus in this embodiment may be used to perform the technical solutions in the method embodiment shown in FIG. 1. Implementation principles and technical effects thereof are similar. Details are not described herein again.

Figure 13:
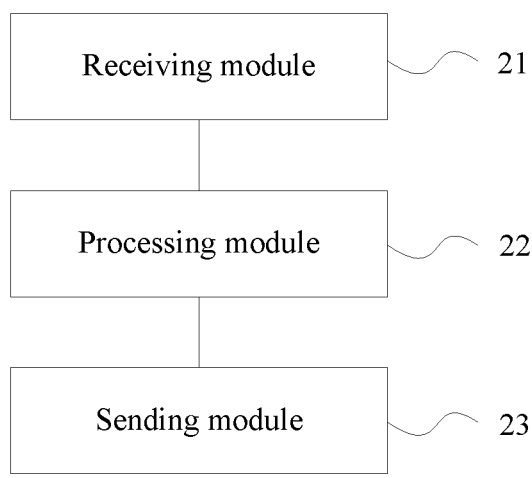
FIG. 13 is a schematic structural diagram of a first embodiment of a terminal according to the present invention.

FIG. 13 is a schematic structural diagram of a first embodiment of a terminal according to the present invention. As shown in FIG. 13, the apparatus in this embodiment may include a receiving module 21, a processing module 22, and a sending module 23. The receiving module 21 is configured to receive downlink control information sent by a base station, where the downlink control information includes uplink scheduling indication information. The processing module 22 is configured to send, by using the sending module 23, uplink data in a plurality of uplink subframes on at least one unlicensed carrier based on the uplink scheduling indication information.

Optionally, the receiving module 21 is specifically configured to receive, by using an unlicensed carrier, the downlink control information sent by the base station; or receive, by using a licensed carrier, the downlink control information sent by the base station.

Optionally, the receiving module 21 is specifically configured to receive, by using one downlink subframe, a plurality of pieces of downlink control information sent by the base station, where a carrier corresponding to the downlink subframe includes an unlicensed carrier and a licensed carrier, and the downlink control information includes uplink scheduling indication information; and the processing module 22 is specifically configured to send, by using the sending module 23, the uplink data separately in a plurality of uplink subframes on one unlicensed carrier based on the plurality of pieces of uplink scheduling indication information, where the uplink scheduling indication information is in a one-to-one correspondence to the uplink subframe.

Optionally, the processing module 22 is further configured to obtain uplink subframe start location information and a quantity of consecutive uplink subframes based on the uplink scheduling indication information; and that the processing module 22 is configured to send, by using the sending module 23, uplink data in a plurality of uplink subframes on at least one unlicensed carrier based on the uplink scheduling indication information includes: determining a plurality of uplink subframes based on the uplink subframe start location and the quantity of consecutive uplink subframes; and sending the uplink data in the plurality of uplink subframes.

Optionally, the processing module 22 is further configured to obtain a start uplink subframe period and a start uplink subframe offset based on the uplink scheduling indication information; and that the processing module 22 is configured to send, by using the sending module 23, uplink data in a plurality of uplink subframes on at least one unlicensed carrier based on the uplink scheduling indication information includes: determining a plurality of uplink subframes based on the uplink subframe start location, the quantity of consecutive uplink subframes, the start uplink subframe period, and the start uplink subframe offset; and sending the uplink data by using the sending module 23 in the plurality of uplink subframes.

Optionally, the processing module 22 is further configured to obtain a carrier index based on the uplink scheduling indication information; and that the processing module 22 is configured to send, by using the sending module 23, uplink data in a plurality of uplink subframes on at least one unlicensed carrier based on the uplink scheduling indication information includes: determining a plurality of uplink subframes on a plurality of unlicensed carriers based on the uplink subframe start location, the quantity of consecutive uplink subframes, and the carrier index; and sending the uplink data by using the sending module 23 in the plurality of uplink subframes on the plurality of unlicensed carriers.

Optionally, the uplink scheduling indication information includes start uplink subframe location information and a start uplink subframe offset, and the receiving module is further configured to receive radio resource control signaling sent by the base station, where the radio resource control signaling includes system configuration information;

the processing module 22 is further configured to obtain a quantity of consecutive uplink subframes and a start uplink subframe period based on the system configuration information; and that the processing module 22 is configured to send, by using the sending module 23, uplink data in a plurality of uplink subframes on at least one unlicensed carrier based on the uplink scheduling indication information includes:

sending the uplink data by using the sending module 23 in the plurality of uplink subframes on the at least one unlicensed carrier based on the radio resource control signaling and the uplink scheduling indication information.

The apparatus in this embodiment may be used to perform the technical solutions in the foregoing method embodiment. Implementation principles and technical effects thereof are similar. Details are not described herein again.

Figure 14:
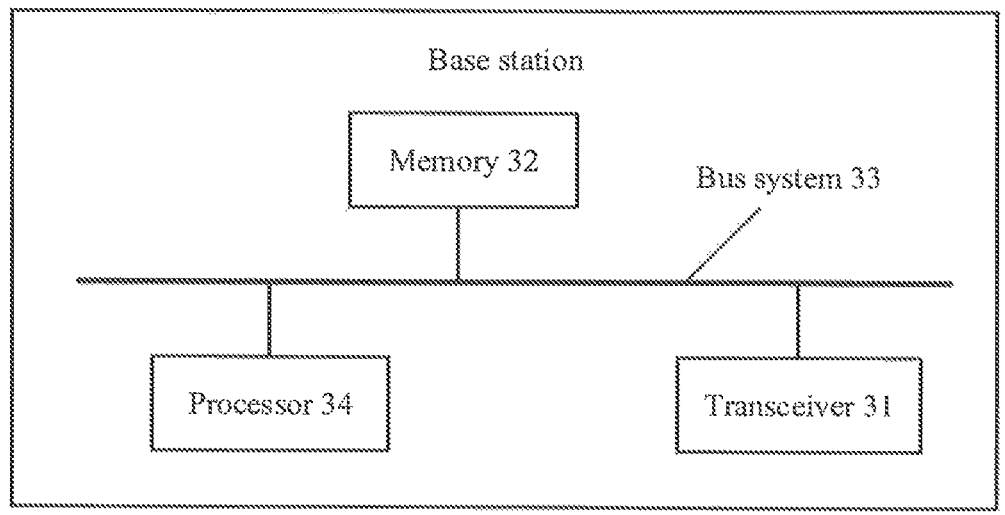
FIG. 14 is a schematic structural diagram of a second embodiment of a base station according to the present invention.

FIG. 14 is a schematic structural diagram of a second embodiment of a base station according to the present invention. As shown in FIG. 14, the base station in this embodiment may include a transceiver 31, a memory 32, a bus system 33, and at least one processor 34; and the transceiver 31, the memory 32, and the at least one processor 34 are connected by using the bus system 33. The memory 32 stores one or more programs, and the one or more programs include an instruction. When the instruction is executed by the base station, the base station performs the steps of the foregoing method embodiment.

It should be noted that the transceiver 31 may be replaced by using a receiver and a transmitter. The sending module 11 in the foregoing embodiment may correspond to the transceiver of the base station. The processing module 12 may correspond to the processor of the base station, and the processor 34 may be a central processing unit (Central Processing Unit, CPU) or an application-specific integrated circuit (Application-Specific Integrated Circuit, ASIC) or one or more integrated circuits that complete this embodiment of the present invention.

Figure 15:
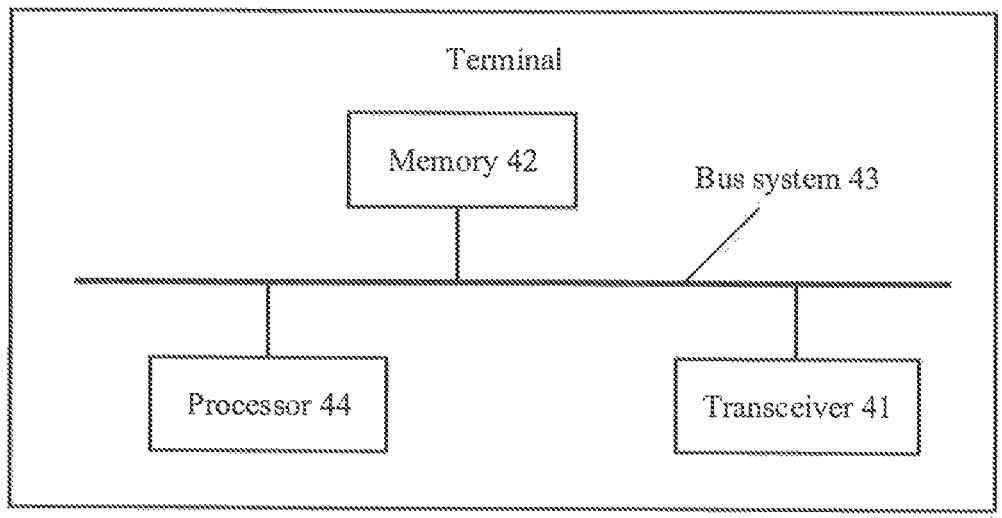
FIG. 15 is a schematic structural diagram of a second embodiment of a terminal according to the present invention.

FIG. 15 is a schematic structural diagram of a second embodiment of a terminal according to the present invention. As shown in FIG. 15, the terminal in this embodiment may include a transceiver 41, a memory 42, a bus system 43, and at least one processor 44; and the transceiver 41, the memory 42, and the at least one processor 44 are connected by using the bus system 43. The memory 42 stores one or more programs, and the one or more programs include an instruction. When the instruction is executed by the terminal, the terminal performs the steps of the foregoing method embodiment.

It should be noted that the transceiver 41 may be replaced by using a receiver and a transmitter. The receiving module 21 and the sending module 22 in the foregoing embodiment may correspond to the transceiver of the terminal, and the processing module 22 may correspond to the processor of the terminal. The processor 44 may be a central processing unit (Central Processing Unit, CPU) or an application-specific integrated circuit (Application-Specific Integrated Circuit, ASIC) or one or more integrated circuits that complete this embodiment of the present invention.

In the several embodiments provided in the present invention, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) or a processor (processor) to perform a part of the steps of the methods described in the embodiments of the present invention. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

It may be clearly understood by persons skilled in the art that, for the purpose of convenient and brief description, division of the foregoing function modules is taken as an example for illustration. In actual application, the foregoing functions can be allocated to different function modules and implemented based on a requirement, that is, an inner structure of an apparatus is divided into different function modules to implement all or part of the functions described above. For a detailed working process of the foregoing apparatus, reference may be made to a corresponding process in the foregoing method embodiments, and details are not further described herein.

It should be finally noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present invention.

What is claimed is:

1. A radio communications method, comprising:
    performing, by a base station, clear channel assessment (CCA) to preempt an unlicensed carrier;
    sending, by the base station using the preempted unlicensed carrier, a plurality of pieces of downlink control information to a terminal using one downlink subframe, wherein the downlink control information comprises uplink scheduling indication information, wherein the uplink scheduling indication information instructs the terminal to send uplink data in a plurality of uplink subframes on an unlicensed carrier, and wherein the uplink scheduling indication information comprises start uplink subframe location information and a quantity of consecutive uplink subframes.

2. The method of claim 1, wherein sending the downlink control information to the terminal comprises sending, by the base station, one piece of the downlink control information to the terminal using one downlink subframe.

3. The method of claim 1, wherein the uplink scheduling indication information further comprises a start uplink subframe period and a start uplink subframe offset.

4. The method of claim 1, wherein the uplink scheduling indication information further comprises a carrier index.

5. The method of claim 1, further comprising sending, by the base station, radio resource control signaling to the terminal, wherein the radio resource control signaling comprises system configuration information, wherein the system configuration information comprises a quantity of consecutive uplink subframes and a start uplink subframe period, and wherein the uplink scheduling indication information comprises start uplink subframe location information and a start uplink subframe offset.

6. The method of claim 1, wherein a difference between an index of a downlink subframe for sending the uplink scheduling indication information and an index of a scheduled uplink subframe is a variable integer value.

7. The method of claim 1, wherein a scheduled uplink subframe and a downlink subframe for sending the downlink control information fall within a same maximum channel occupancy time (MCOT).

8. The method of claim 1, wherein sending the downlink control information further comprises sending uplink information to the terminal instructing the terminal to send uplink data using at least one licensed carrier.

9. The method of claim 1, wherein sending the downlink control information comprises sending a plurality of pieces of the downlink control information, wherein each piece of the downlink control information comprises a piece of the uplink scheduling indication information, wherein receiving the uplink data in the uplink subframes on the unlicensed carrier comprises receiving, from the terminal, the uplink data separately in the uplink subframes on the unlicensed carrier based on a plurality of pieces of the uplink scheduling indication information, and wherein the piece of the uplink scheduling indication information comprises a one-to-one correspondence to one uplink subframe.

10. The method of claim 1, wherein carriers corresponding to the one downlink subframe comprise an unlicensed carrier and a licensed carrier.

11. A radio communications method, comprising:
receiving, by a terminal using an unlicensed carrier, a plurality of pieces of downlink control information using one downlink subframe, wherein carriers corresponding to the one downlink subframe comprise a preempted unlicensed carrier and a licensed carrier, and wherein the downlink control information comprises uplink scheduling indication information from a base station; and
sending, by the terminal, uplink data in a plurality of uplink subframes on the unlicensed carrier based on the uplink scheduling indication information.

12. The method of claim 11, wherein each piece of the downlink control information comprises a piece of the uplink scheduling indication information, wherein sending the uplink data in the uplink subframes on the unlicensed carrier comprises sending, by the terminal, the uplink data separately in the uplink subframes on the unlicensed carrier based on a plurality of pieces of the uplink scheduling indication information, and wherein the piece of the uplink scheduling indication information comprises a one-to-one correspondence to one uplink subframe.

13. The method of claim 11, further comprising obtaining, by the terminal, uplink subframe start location information and a quantity of consecutive uplink subframes based on the uplink scheduling indication information, and wherein sending the uplink data in the uplink subframes on the at least one unlicensed carrier comprises:
determining, by the terminal, the uplink subframes based on the uplink subframe start location information and the quantity of consecutive uplink subframes; and
sending, by the terminal, the uplink data in the uplink subframes.

14. The method of claim 13, further comprising obtaining, by the terminal, a start uplink subframe period and a start uplink subframe offset based on the uplink scheduling indication information, and wherein sending the uplink data in the uplink subframes on the at least one unlicensed carrier comprises:
determining, by the terminal, the uplink subframes based on the uplink subframe start location information, the quantity of consecutive uplink subframes, the start uplink subframe period, and the start uplink subframe offset; and
sending, by the terminal, the uplink data in the uplink subframes.

15. The method of claim 13, further comprising obtaining, by the terminal, a carrier index based on the uplink scheduling indication information, and wherein sending the uplink data in the uplink subframes on the at least one unlicensed carrier comprises:
determining, by the terminal, the uplink subframes on a plurality of unlicensed carriers based on the uplink subframe start location information, the quantity of consecutive uplink subframes, and the carrier index; and
sending, by the terminal, the uplink data in the uplink subframes on the unlicensed carriers.

16. The method of claim 11, wherein the uplink scheduling indication information comprises start uplink subframe location information and a start uplink subframe offset, and wherein the method further comprises:
receiving, by the terminal, radio resource control signaling comprising system configuration information from the base station; and
obtaining, by the terminal, a quantity of consecutive uplink subframes and a start uplink subframe period based on the system configuration information, and
wherein sending the uplink data in the uplink subframes on the at least one unlicensed carrier comprises sending, by the terminal, the uplink data in the uplink subframes on the unlicensed carrier based on the radio resource control signaling and the uplink scheduling indication information.

17. The method of claim 11, wherein a difference between an index of a downlink subframe in which the terminal receives the uplink scheduling indication information and an index of a scheduled uplink subframe is a variable integer value.

18. The method of claim 11, wherein a scheduled uplink subframe and a downlink subframe for receiving the uplink scheduling indication information fall within a same maximum channel occupancy time (MCOT).

19. The method of claim 11, wherein receiving the downlink control information further comprises receiving, by the terminal, the downlink control information from the base station using a licensed carrier.

20. A computer program product comprising computer-executable instruction for storage on a non-transitory computer-readable medium that, when executed by a processor, cause a base station to:
perform clear channel assessment (CCA) to preempt an unlicensed carrier;
send, using the unlicensed carrier, a plurality of pieces of downlink control information to a terminal using one downlink subframe, wherein carriers corresponding to the one downlink subframe comprise an unlicensed carrier and an unlicensed carrier, wherein the downlink control information comprises uplink scheduling indication information employing a self-scheduling mode, and wherein the uplink scheduling indication information instructs the terminal to send uplink data in a plurality of uplink subframes on an unlicensed carrier; and
receive the uplink data in the uplink subframes on the unlicensed carrier, wherein the uplink scheduling indication information comprises start uplink subframe location information and a quantity of consecutive uplink subframes.

\* \* \* \* \*